United States Patent
Chuma et al.

(10) Patent No.: US 11,980,871 B2
(45) Date of Patent: May 14, 2024

(54) CATALYST ARTICLE FOR EXHAUST SYSTEM OF NATURAL GAS ENGINE

(71) Applicant: Johnson Matthey Public Limited Company, London (GB)

(72) Inventors: Moyahabo Hellen Chuma, Brummeria (SA); Glenn Jones, Reading (GB); Jane Ngima Mugo, Brummeria (SA); Agnes Raj, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/938,392

(22) Filed: Oct. 6, 2022

(65) Prior Publication Data
US 2023/0110753 A1    Apr. 13, 2023

(30) Foreign Application Priority Data
Oct. 12, 2021    (EP) .................................. 21202109

(51) Int. Cl.
*B01J 21/04* (2006.01)
*B01D 53/88* (2006.01)
(Continued)

(52) U.S. Cl.
CPC ............ *B01J 23/60* (2013.01); *B01D 53/885* (2013.01); *B01D 53/9454* (2013.01);
(Continued)

(58) Field of Classification Search
CPC ... B01J 21/04; B01J 23/42; B01J 23/44; B01J 23/60; B01J 23/6562
(Continued)

(56) References Cited

U.S. PATENT DOCUMENTS 3,867,309 A * 2/1975 Oleck ...................... B01J 35/10
502/262
3,945,947 A * 3/1976 Sakai ................... B01D 53/945
502/324
(Continued)

FOREIGN PATENT DOCUMENTS

CN     101842561 B     6/2012
CN     109070000 A     12/2018
(Continued)

OTHER PUBLICATIONS

Willis Joshua J. et al, "Systematic Identification of Promoters for Methane Oxidation Catalysts Using Size- and Composition-Controlled Pd-Based Bimetallic Nanocrystals", Journal of the American Chemical Society, vol. 139, No. 34, Aug. 30, 2017, pp. 11989-11997.

*Primary Examiner* — Cam N. Nguyen
(74) *Attorney, Agent, or Firm* — BakerHostetler

(57) ABSTRACT

The present invention relates to a catalyst article for the exhaust system of a natural gas engine with improved sulphur and/or water tolerance. The catalyst article comprises a doped palladium-on-alumina catalyst, wherein the palladium-on-alumina catalyst is doped with manganese and/or zinc. The invention further relates to an exhaust gas treatment system, a natural gas combustion engine and to a method for the treatment of an exhaust gas from a natural gas combustion engine.

5 Claims, 2 Drawing Sheets

(51) Int. Cl.
*B01D 53/94* (2006.01)
*B01J 23/42* (2006.01)
*B01J 23/44* (2006.01)
*B01J 23/60* (2006.01)
*B01J 23/656* (2006.01)
*B01J 37/02* (2006.01)

(52) U.S. Cl.
CPC ........... *B01J 21/04* (2013.01); *B01J 23/6562* (2013.01); *B01J 37/0226* (2013.01); *B01D 2255/1023* (2013.01); *B01D 2255/2073* (2013.01); *B01D 2255/20792* (2013.01); *B01D 2255/2096* (2013.01); *B01D 2258/018* (2013.01)

(58) Field of Classification Search
USPC .................... 502/324, 332–334, 355, 415
See application file for complete search history.

(56) References Cited

U.S. PATENT DOCUMENTS

| | | | | |
|---|---|---|---|---|
| 4,636,485 A * | 1/1987 | van der Smissen | ..... | B01J 27/10 502/313 |
| 5,196,390 A * | 3/1993 | Tauster | ................ | B01D 53/945 502/251 |
| 5,559,273 A * | 9/1996 | Guth | ....................... | C11D 1/722 252/8.81 |
| 6,069,111 A * | 5/2000 | Yamamoto | ............... | B01J 23/89 502/341 |
| 6,413,449 B1 * | 7/2002 | Wieland | .................... | B01J 23/60 423/652 |
| 6,627,578 B2 * | 9/2003 | Xu | ........................ | B01J 23/8926 502/333 |
| 6,903,046 B2 * | 6/2005 | Ding | ..................... | C07C 209/16 502/328 |
| 7,208,136 B2 * | 4/2007 | Holladay | ............. | B01J 19/0093 502/343 |
| 7,670,987 B2 * | 3/2010 | Kawashima | .............. | C01B 3/40 502/355 |
| 8,034,311 B2 * | 10/2011 | Ikeda | ................... | B01D 53/944 502/262 |
| 8,343,456 B2 * | 1/2013 | Kawashima | ......... | B01J 37/0205 423/652 |
| 8,461,073 B2 * | 6/2013 | Tomoda | ................ | C01G 45/006 502/345 |
| 8,658,560 B1 * | 2/2014 | Han | .......................... | B01J 21/18 502/329 |
| 9,174,199 B2 * | 11/2015 | Zhang | ...................... | C01B 3/326 |
| 9,636,634 B2 * | 5/2017 | Chiffey | ................. | B01J 37/0036 |
| 10,035,134 B2 * | 7/2018 | Dornhaus | ............... | B01J 35/04 |
| 10,286,359 B2 * | 5/2019 | Chiffey | .................... | B01J 23/58 |
| 10,335,776 B2 * | 7/2019 | Sung | ........................ | B01J 23/96 |
| 10,392,980 B2 * | 8/2019 | Dobson | ................ | B01J 35/0006 |
| 10,695,749 B2 * | 6/2020 | Xiao | ......................... | B01J 23/60 |
| 10,801,384 B2 * | 10/2020 | Hengst | ................. | B01J 35/1019 |
| 10,828,623 B2 * | 11/2020 | Nunan | .................... | F01N 3/2803 |
| 10,864,502 B2 * | 12/2020 | Sung | ....................... | B01J 37/0246 |
| 10,894,760 B2 * | 1/2021 | Vardon | .................. | B01J 35/1019 |
| 10,919,026 B2 * | 2/2021 | Xiao | ....................... | B01J 23/89 |
| 11,000,832 B1 * | 5/2021 | Do | ........................... | B01J 37/0063 |
| 11,167,246 B2 * | 11/2021 | Chiffey | ................ | B01J 29/7007 |
| 11,305,260 B2 * | 4/2022 | Qi | ........................... | B01J 35/1076 |
| 11,311,865 B2 * | 4/2022 | Sung | ....................... | B01J 37/0246 |
| 11,338,245 B2 * | 5/2022 | Chiffey | ................. | B01J 37/0236 |
| 2001/0016188 A1 * | 8/2001 | Haga | ...................... | C01B 3/326 502/343 |
| 2015/0148225 A1 * | 5/2015 | Nazarpoor | .......... | B01J 23/8986 502/324 |
| 2017/0314448 A1 | 11/2017 | Brown | | |
| 2020/0030745 A1 * | 1/2020 | Utschig | ................ | B01J 37/0018 |
| 2020/0032687 A1 * | 1/2020 | Utschig | ................ | B01J 35/0006 |
| 2020/0188887 A1 | 6/2020 | Kobayashi | | |
| 2021/0283582 A1 * | 9/2021 | Liu | ........................ | B01J 35/0013 |
| 2022/0219150 A1 * | 7/2022 | Li | ............................ | B01J 37/08 |
| 2023/0321636 A1 * | 10/2023 | Sung | ........................ | B01J 23/10 502/241 |
| 2023/0372905 A1 * | 11/2023 | Kazi | ....................... | B01J 35/613 |

FOREIGN PATENT DOCUMENTS

| | | |
|---|---|---|
| CN | 113209964 A | 8/2021 |
| CN | 114870835 A | 8/2022 |
| EP | 3096872 B1 | 5/2019 |
| WO | 2009057959 A2 | 5/2009 |
| WO | 2015081171 A1 | 6/2015 |
| WO | 2017006128 | 1/2017 |
| WO | 2017187412 A1 | 11/2017 |

* cited by examiner

CATALYST ARTICLE FOR EXHAUST SYSTEM OF NATURAL GAS ENGINE

The present invention relates to a catalyst article for the exhaust system of a natural gas engine and, in particular, to one which has improved sulphur and water tolerance due to the presence of additional Mn and/or Zn in a Pd-on-Alumina catalyst.

Natural gas is of increasing interest as an alternative fuel for vehicles and stationary engines that traditionally use gasoline and diesel fuels. Natural gas is composed mainly of methane (typically 70-90%) with variable proportions of other hydrocarbons such as ethane, propane and butane (up to 20% in some deposits) and other gases. It can be commercially produced from oil or natural gas fields and is widely used as a combustion energy source for power generation, industrial cogeneration and domestic heating. It can also be used as a vehicle fuel.

Natural gas can be used as transportation fuel in the form of compressed natural gas (CNG) and liquefied natural gas (LNG). CNG is carried in tanks pressurised to 3600 psi (~248 bar) and has an energy density around 35% of gasoline per unit volume. LNG has an energy density 2.5 times that of CNG and is mostly used for heavy-duty vehicles. It is cooled to liquid form at −162° C. and as a result the volume is reduced 600 fold meaning LNG is easier to transport than CNG. Bio-LNG could be an alternative to natural (fossil) gas, being produced from biogas, derived by anaerobic digestion from organic matter such as landfill waste or manure.

Natural gas has a number of environmental benefits: it is a cleaner burning fuel typically containing few impurities, it contains higher energy (Bti) per carbon than traditional hydrocarbon fuels resulting in low carbon dioxide emissions (25% less greenhouse gas emissions), and it has lower emissions of PM and $NO_x$ compared to diesel and gasoline. Biogas could reduce such emissions further.

Further drivers for the adoption of natural gas include high abundance and lower cost compared to other fossil fuels.

Natural gas engines emit very low PM and $NO_x$ (up to 95% and 70% less, respectively) compared to heavy-duty and light-duty diesel engines. However, exhaust gas produced by NG engines often contains significant quantities of methane (so-called "methane slip"). The regulations which cap emissions from these engines currently include Euro VI and the US Environmental Protection Agency (EPA) greenhouse gas legislation. These impose emissions limits for methane, nitrogen oxides (NOx) and particulate matter (PM).

The two main operating modes used for methane fueled engines are stoichiometric conditions ($\lambda=1$) and lean burn conditions ($\lambda \geq 1.3$). Palladium-based catalysts are well known as the most active type of catalyst for methane oxidation under both conditions. The regulated emissions limits for both stoichiometric and lean burn compressed natural gas engines can be met by the application of either palladium-rhodium three-way catalyst (TWC) or platinum-palladium oxidation catalyst respectively.

The growth of this Pd based catalyst technology depends on overcoming challenges in terms of cost and catalyst deactivation due to sulphur, water and thermal ageing.

Methane is the least reactive hydrocarbon and high energy is required to break the primary C—H bond. The ignition temperature of alkanes generally decreases with increasing fuel to air ratio and increasing hydrocarbon chain length which correlates with the C—H bond strength. It is known that with Pd-based catalysts, the light-off temperature for methane conversion is higher than for other hydrocarbons (where "light-off temperature" means the temperature at which conversion reaches 50%).

When operating in stoichiometric conditions ($\lambda=1$), a TWC is used as an effective and cost efficient after-treatment system to combust methane. Mostly bimetallic Pd—Rh catalysts with high total platinum group metal (pgm) loadings of $>200$ gft$^{-3}$ are needed for high levels of methane conversion to meet end of life total hydrocarbon (THC) regulations due to the very low reactivity of this hydrocarbon and catalyst deactivation via thermal and chemical effects. Use of high pgm loadings will improve the overall HC conversion in stoichiometric CNG engines. However, high methane conversions can be achieved with relatively low pgm based on engine calibration, i.e. controlling air to fuel ratio so as to operate near stoichiometric or rich of stoichiometric; the pgm loading can also be varied corresponding to the regional legislation requirement with regards to methane and non-methane conversions.

The reduction of $NO_x$ and oxidation of methane is also more difficult under very oxidising conditions. For lean burn CNG applications, Pd—Pt at high total pgm loadings ($>200$ gft$^{-3}$) are needed for methane combustion at lower temperatures. Unlike with stoichiometric engines, a reductant also needs to be injected into the exhaust stream in order to be able to reduce $NO_x$ in the presence of excess oxygen. This is normally in the form of ammonia ($NH_3$), and thus lean burn applications require a completely different catalyst system to those that are stoichiometric, where efficient $NO_x$ reduction can be achieved with the use of CO or HC at slightly rich or stoichiometric conditions.

Due to the unreactive (or poorly reactive) nature of methane at lower temperatures, increased methane emissions result during cold start and idle situations, mainly for lean burn where the exhaust temperatures are lower than stoichiometric. In order to improve the reactivity of methane at lower temperatures, one of the options is to use high pgm loadings, which increases costs.

Natural gas catalysts, especially Pd-based catalysts, may suffer from poisoning by water (5-12%) and sulphur (<0.5 ppm $SO_2$ in lube oil) especially under lean conditions, which results in drastic reduction of conversion rate of the catalyst over time. The deactivation due to water is significant due to the formation of hydroxyl, carbonates, formates and other intermediates on the catalyst surface. The activity is reversible and can be recovered completely if water is removed. However, this is impractical as methane combustion feed always contains a high level of water due to the high content of H in methane.

$H_2O$ can be either an inhibitor or a promoter depending on the air-to-fuel ratio, i.e. lambda. Under stoichiometric and reducing conditions, lambda $>1$, $H_2O$ can act as a promoter for the oxidation of hydrocarbons through the steam reforming reaction in both CNG and gasoline engines. However for lean burn CNG operating at lambdas $>1$, $H_2O$ acts as an inhibitor for methane oxidation. It is critical to understand the water inhibition effect and design catalysts which are more tolerant to the presence of $H_2O$. This would allow for improvement when trying to control methane emissions from lean burn CNG.

Though the sulphur level is very low in the engine exhaust, Pd-based catalysts deactivate significantly upon sulphur exposure due to the formation of stable sulphates. Regeneration of the catalyst in order to restore the activity following sulphur poisoning is challenging and will usually require high temperatures, rich operation or both. This is easily achievable in stoichiometric operation but more difficult in lean burn. A lean burn vehicle operates with a much higher air-to-fuel ratio than a stoichiometric vehicle and will need injection of a much higher concentration of reductant to switch to rich operation. Thermal deactivation resulting from a high level of misfire events due to poor engine transient control and ignition systems destroys the catalyst and correspondingly leads to a high level of exhaust emissions.

The catalyst deactivates under both conditions, but sulphur poisoning has a more dramatic impact than thermal ageing in lean operation. Sulphur poisoning can be improved by the addition of small amounts of Pt to the Pd catalyst. This is because the sulphur inhibition due to formation of palladium sulphates can be reduced significantly on addition of Pt. However, the addition of Pt further increases the costs.

Accordingly, there is a desire for the provision of an improved catalyst for natural gas combustion engines to reduce methane emissions by tackling catalyst deactivation, such as by sulphur, water and thermal ageing, without increasing the cost of the catalyst. It is an object of the present invention to address this problem, tackle the disadvantages associated with the prior art, or at least provide a commercially useful alternative thereto.

According to a first aspect there is provided a catalyst article for the treatment of an exhaust from a natural gas combustion engine, the article comprising a doped palladium-on-alumina catalyst, wherein the palladium-on-alumina catalyst is doped with manganese (Mn) and/or zinc (Zn).

In the following passages different aspects/embodiments are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

A catalyst article is a component suitable for use in an exhaust gas system. Typically such articles are honeycomb monoliths, which may also be referred to as "bricks". These have a high surface area configuration suitable for contacting the gas to be treated with a catalyst material to effect a transformation or conversion of components of the exhaust gas. Other forms of catalyst article are known and include plate configurations, as well as wrapped metal catalyst substrates. The catalyst described herein is suitable for use in all of these known forms, but is especially preferred that it takes the form of a honeycomb monolith as these provide a good balance of cost and manufacturing simplicity.

Preferably the doped palladium-on-alumina catalyst is provided as a washcoat on a substrate. Alternatively, the doped palladium-on-alumina catalyst is provided as a component of an extruded substrate. Preferably, in either case, the substrate is a flow-through monolith. Preferably, where the catalyst is provided as a washcoat on a substrate, the substrate is a flow-through ceramic monolith.

The catalyst article is for the treatment of an exhaust from a natural gas combustion engine. That is, the catalyst article is for the catalytic treatment of exhaust gases from a natural-gas combustion engine in order to convert or transform components of the gases before they are emitted to the atmosphere in order to meet emissions regulations. When natural gas is combusted it will produce both carbon dioxide and water, but the exhaust gas also contains an amount of additional methane (and other short chain hydrocarbons) that needs to be catalytically removed before the exhaust is emitted to the atmosphere. The exhaust gases also typically contain significant amounts of water and sulphur that can build up and deactivate the catalyst.

In mobile applications, natural gas combustion may be configured to run in a lean or stoichiometric configuration. By a "mobile application", it is meant that the system may generally be suitable for use in an automobile or other vehicle (e.g. off-road vehicles)—in such systems there may be changes during operation in the fuel supply and demand, depending on operator requirements, such as acceleration. In a mobile application it is generally possible to temporarily run the system in a rich mode, which is associated with a significant increase in temperatures which help to burn off the sulphur poisoning the catalyst and to remove accumulated water.

In stationary systems, natural gas combustion may also be configured to operate under lean or stoichiometric conditions. Examples of stationary systems include gas turbines and power generation systems—in such systems the combustion conditions and fuel composition are generally kept constant for long operating times. This means that, compared to mobile applications, there is less opportunity to have a regeneration step to remove sulphur and moisture contaminants. Therefore, the benefits described herein may be of particular benefit for stationary applications. That is, it is especially desirable to provide a catalyst which has high sulphur and moisture tolerance when there are limited opportunities to regenerate the catalyst.

Although the above "lean" and "stoichiometric" systems are described as "mobile" and "stationary", it should be appreciated that both system types can be used across a range of different applications.

The catalyst article comprises a doped palladium-on-alumina catalyst. That is, the article comprises a catalyst which includes as a component (preferably as the only catalytically active component) an alumina support provided as a carrier supporting palladium and a dopant. Alumina is an extremely common support for use in catalyst applications and selecting a suitable alumina is commonplace in the art. Selecting a suitable amount of alumina for forming the catalyst will depend on the form of the substrate, as discussed herein.

The alumina may be provided in one or more different crystal forms. Gamma alumina is generally most preferred for its thermal stability. The alumina may comprise one or more dopants to assist in improving its stability and typical dopants include Si and La. Dopants for stabilising the alumina are preferably present in an amount of less than 15 wt %, more preferably less than 10 wt %, by weight of the alumina. These dopants for the alumina may be present in an amount of from 1 to 10 wt %, by weight of the alumina.

Depending on the form of the catalyst article, the catalyst may further comprise additional non-catalytic components. For example, it is conventional for a washcoat to include binders, including clays and other alumina components. For example, it is conventional for extruded catalyst monoliths to include additional fillers and processing aids, such as glass fibers and clays.

Preferably the catalyst article has a Pd loading of from 50 to 300 g/ft$^3$, preferably from 70 to 250 g/ft$^3$ and more preferably from 100 to 200 g/ft$^3$. These levels are effective for treating the methane in the exhaust gas and may be significantly higher than those for TWCs.

The palladium-on-alumina catalyst is doped with manganese and/or zinc. Most preferably the catalyst is doped with either Mn or Zn. Preferably the catalyst article has a total loading of Mn and/or Zn of from 5 to 100 g/ft$^3$, preferably from 20 to 80 g/ft³ and more preferably from 40 to 60 g/ft³. By total loading, it is meant the sum of all of the Mn and Zn present (e.g. the amount of Mn present when there is no Zn). As explained below, these two elements have been found to be particularly effective at promoting the palladium and providing improved performance of the catalyst when challenged with sulphur and/or moisture.

Preferably the catalyst article has a ratio of the Pd loading to the total loading of Mn and/or Zn of greater than 1:1, preferably from 1:1 to 10:1, more preferably from 2:1 to 5:1 and most preferably about 3:1. The Mn and/or Zn is present to promote the reactions achieved by the Pd, so the amount of dopant is generally equal to or less than the amount of promoted Pd.

The present inventors sought to provide a natural gas engine after treatment system capable of the combustion of methane at lower temperatures. The inventors surprisingly found that the inclusion of Mn and/or Zn had a positive effect on (i) the methane conversion performance under wet and dry conditions and (ii) the sulphur tolerance of the catalyst. In particular, experimental SCAT analysis reveals that the Mn and Zn doped Pd/Al$_2$O$_3$ catalysts exhibit improved light off activity for methane at low temperatures under both dry and wet conditions. This suggest that doping the Pd/Al$_2$O$_3$ with either Mn or Zn improves the performance of the catalyst better than Pt doped Pd/Al$_2$O$_3$ catalysts. A sulphur tolarance test was also done on these catalysts where both Mn and Zn doped catalysts showed similar improvements towards sulphur tolerance.

Without wishing to be bound by theory, it appears that doping Pd with Mn reduces the activation energy ($E_a$) and enhances its resistance to OH poisoning better than other dopants. Similar performance was observed with Zn.

Using computational simulations, models that assist in understanding the fundamentals of these reactions, were developed. In this model, the PdO(100) surface was doped with a series of +2 oxidation state elements as listed in Table 1. The activation energy barrier ($E_a$) of methane over the doped surfaces and adsorption energies of various intermediate species were calculated to build up the model. The model predicted that doping with either Mn or Zn reduces activation energies and may enhance resistance to OH or SO$_2$ poisoning.

TABLE 1

Variously doped PdO(100) surfaces, activation energy barriers, adsorption energies for OH, O and SO$_2$ species.

| Surfaces | $E_a$ | $E_{ads}$(OH*) | $E_{ads}$(O*) | $E_{ads}$(SO$_2$*) |
|---|---|---|---|---|
| PdO | 1.43 | −0.97 | −1.14 | −2.43 |
| Pt doped PdO | 1.40 | −1.30 | −1.94 | −1.59 |
| Mn doped PdO | 1.22 | 0.31 | −0.65 | −1.50 |
| Se doped PdO | 1.68 | −0.15 | −0.56 | −2.10 |
| Cu doped PdO | 1.69 | −0.62 | −1.08 | −1.82 |
| Zn doped PdO | 1.24 | −0.19 | −0.32 | −2.30 |
| Cd doped PdO | 1.47 | −0.23 | −0.42 | −2.34 |
| Ge doped PdO | 1.55 | −0.63 | −1.27 | −1.86 |
| Ba doped PdO | 1.38 | −0.17 | −0.23 | −2.92 |
| Sr doped PdO | 1.35 | −0.33 | −0.38 | −2.89 |
| Sn doped PdO | 1.49 | −1.46 | −2.17 | −1.53 |

To confirm the activity of these doped PdO(100) surfaces, a kinetic model was then developed using three variables namely, $\delta G((CH_{4\_}TS^*)$, $\delta G(OH^*)$ and $\delta G(O^*)$. Where $\delta G(CH_{4\_}TS^*)$ is the first dissociation step of CH$_4$ considered as the rate determing step, $\delta G(OH^*)$ representing the tolerance to water poisoning and $\delta G(O^*)$ being the adsorption of oxygen on Pd surface to create the active site. Mn was suggested to enhance the activity of the PdO(100) surface at lower temperatures.

Preferably the doped palladium-on-alumina catalyst further comprises platinum, preferably in loading of from 50 to 300 g/ft³, preferably from 70 to 250 g/ft³ and more preferably from 100 to 200 g/ft³. Preferably the ratio by weight of Pt to Pd is less than 1:1, preferably from 1:2 to 1:10. Pt is a well-known complementary pgm which is present to improve the oxidation performance of the catalyst as a whole.

Mn and Zn are clearly shown in the table above to be better than PdO alone under all circumstances. However, the other elements shown are a balance of strengths and weaknesses. Preferably the doped palladium-on-alumina catalyst comprises one or more further dopant elements selected from Se, Cu, Cd, Ge, Ba, Sr and Sn. As shown in the table above, each of these dopants has a different balance of effects on the activation energy, the energy of OH, O and SO$_2$ absorption. This means that, depending on the specific application required, it may be desirable to add a component with a particular benefit, even if offset by some disadvantages. For example, Cd would give a strong improvement with regard to water resistance, while only providing a mild disadvantage to the activation energy.

Preferably the one or more further dopant elements is present in a loading of from 5 to 100 g/ft³, preferably from 20 to 80 g/ft³ and more preferably from 40 to 60 g/ft³. Preferably the one or more further dopants are present in a mass ratio to the total amount of Mn and Zn of less than 1:1, preferably less than 3:1 and more preferably less than 5:1. This is because the Mn and Zn generally have a positive effect, whereas the further dopants would generally be provided for secondary benefits.

According to a further aspect there is provided an exhaust gas treatment system comprising the catalyst article as described herein. An exhaust gas treatment system generally has an inlet end configured to receive the exhaust gases from a combustion chamber and an outlet for releasing treated exhaust gases to the atmosphere. In line with the catalyst article in the exhaust gas system there may be one or more other catalytic or filtering components suitable for treating other components of the exhaust gases or providing additional treatment for the methane to avoid slip.

According to a further aspect there is provided a natural gas combustion engine comprising the exhaust gas treatment system as described herein. Preferably the natural gas combustion engine is configured to run under lean conditions. The natural gas combustion engine may be a stationary engine. As discussed above, since catalyst regeneration is more difficult in stationary systems, it is especially critical that the catalyst is stable to sulphur and moisture contamination. Otherwise the catalyst will need to be taken offline and regenerated separately, which can lead to process inefficiencies and costs.

According to a further aspect there is provided a method for the treatment of an exhaust from a natural gas combustion engine, the method comprising contacting the exhaust gas with the catalyst article as described herein. Preferably the exhaust gas is obtained by the combustion of a natural gas, the exhaust gas comprising at least 0.5 ppm sulphur dioxide. Preferably the exhaust gas is obtained by the combustion of a natural gas, the exhaust gas comprising from 5 to 12 wt % water. As will be appreciated, these types of exhaust gases are conventional when treating exhausts from natural gas combustion and it is these that benefit most clearly from the catalyst article described herein with its improved water and sulphur tolerance.

Preferably during the step of contacting the exhaust gas with the catalyst article, the temperature of the exhaust gas is less than 550° C., preferably less than 500° C. For example, the exhaust gas may have a temperature of approximately 450° C. These conditions are especially common in lean operated systems.

FIGURES

The invention will be described further in relation to the following non-limiting Figures, in which.

EXAMPLES

Figure 1:
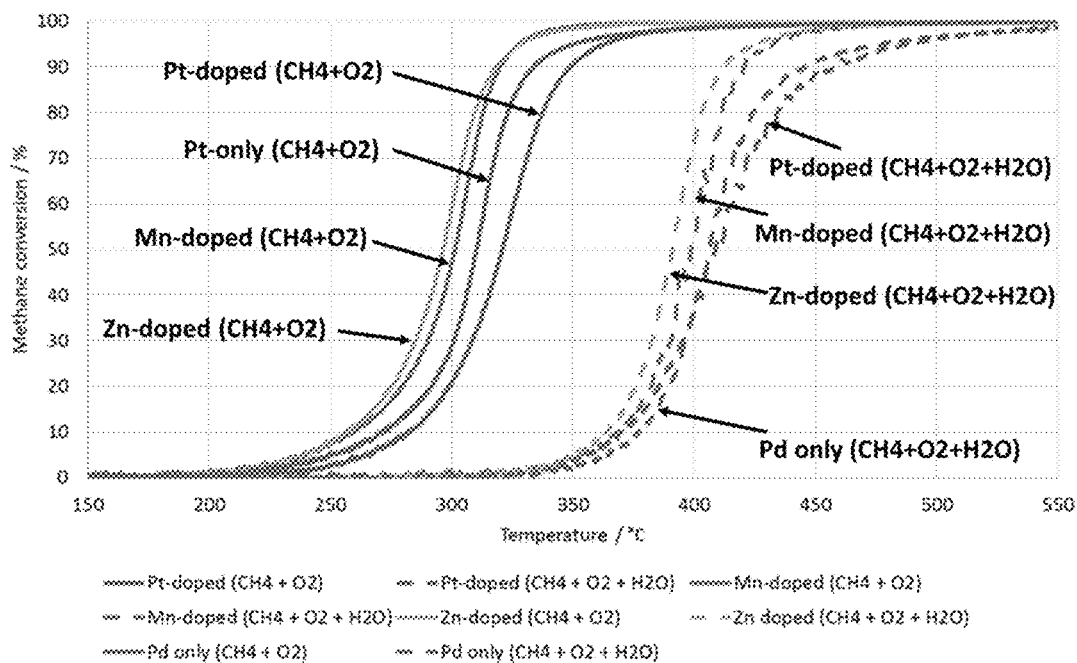
FIG. 1 shows the methane conversion (%) as a function of temperature under dry and wet conditions. In this figure, from left to right at 50% conversion, the lines are Zn doped (dry), Mn doped (dry), undoped (dry), Pt-doped (dry), and then Zn doped (wet), Mn doped (wet), undoped (wet), and Pt-doped (wet).
Figure 2:
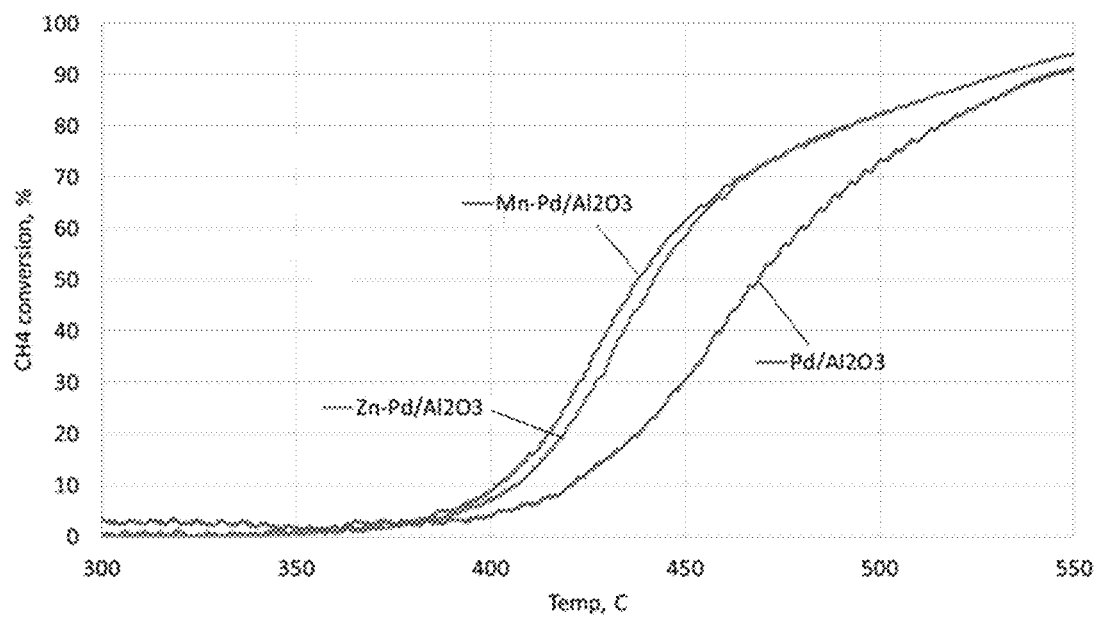
FIG. 2 shows the methane conversion (%) as a function of temperature using a 0.5 ppm $SO_2$ reaction gas feed. In this figure, at 425° C., the best conversion is obtained with Mn and then with Zn.

The invention will now be described further in relation to the following non-limiting examples.

Example 1

A catalyst composition comprising 1 wt % Mn-2.85 wt % Pd/on undoped alumina (SCFA 140) was prepared as follows.

0.9 g manganese nitrate tetrahydrate was dissolved in minimum amount of water and added to 3.75 g Pd nitrate followed by further dilution with ~1 ml water. The mixture was added dropwise to 20 g of the alumina support with constant stirring followed by rinsing. The mixture was dried in oven for 3 h followed by calcined at 500° C. for 2 h.

The total loading of Pd in this catalyst was approximately 128 $g/ft^3$ and the total loading of Mn was approximately 45 $g/ft^3$.

Example 2

A further catalyst composition comprising 1 wt % Zn-2.85 wt % Pd/on undoped alumina (SCFA 140) was prepared as follows.

0.9 g zinc nitrate hexahydrate was dissolved in minimum amount of water and added to 3.77 g Pd nitrate followed by further dilution with ~1 ml water. The mixture was added dropwise to 20 g of the alumina support with constant stirring followed by rinsing. The mixture was dried in oven for 3 h followed by calcined at 500° C. for 2 h.

The total loading of Pd in this catalyst was approximately 128 $g/ft^3$ and the total loading of Zn was approximately 45 $g/ft^3$.

Catalyst Testing

Pelletised samples (0.2-0.4 g, 250-300 μm) of the catalyst compositions prepared in Examples 1 and 2 were tested in a synthetic catalytic activity test (SCAT) apparatus for water and sulphur tolerance using the inlet gas mixtures described below with a space velocity (SV) of 45 k at a range of temperatures (ramped from 150 to 450° C. at a ramp rate 10-15° C./minute).

For water tolerance testing, the following inlet gas mixtures were employed:

Dry: 4000 ppm $CH_4$, 8% $O_2$, balance $N_2$
Wet: 4000 ppm $CH_4$, 8% $O_2$, 10% $H_2O$, balance $N_2$ For sulphur tolerance testing, the following inlet gas mixture was employed: 4000 ppm $CH_4$, 30 ppm $C_3H_8$, 100 ppm $C_2H_6$, 1000 ppm CO, 5% $CO_2$, 500 ppm NO, 8% $O_2$, 10% $H_2O$, 0.5 ppm $SO_2$, balance $N_2$.

Both of these examples showed improved sulphur resistance, improved moisture resistance and better catalytic activity compared to an undoped Pd-catalyst, as shown in the figures.

Although preferred embodiments of the disclosure have been described herein in detail, it will be understood by those skilled in the art that variations may be made thereto without departing from the scope of the disclosure or of the appended claims.

The invention claimed is:

1. A catalyst article for the treatment of methane in an exhaust gas from a natural gas combustion engine, wherein the exhaust gas comprises 5 to 12 wt % water,
   wherein the catalyst article comprises a doped palladium-on-alumina catalyst, wherein the palladium-on-alumina catalyst is doped with zinc,
   wherein the catalyst article has a palladium loading of from 100 to 200 $g/ft^3$, wherein the catalyst article has a zinc loading of from 20 to 80 $g/ft^3$.

2. The catalyst article according to claim 1, wherein the catalyst article has a total loading of Zn of from 40 to 60 $g/ft^3$.

3. The catalyst article according to claim 1, wherein the doped palladium-on-alumina catalyst is provided as a washcoat on a substrate.

4. The catalyst article according to claim 1, wherein the doped palladium-on-alumina catalyst is provided as a component of an extruded substrate.

5. The catalyst article according to claim 1, wherein the substrate is a flow-through ceramic monolith.

* * * * *